(12) United States Patent
Dysle

(10) Patent No.: US 7,793,468 B2
(45) Date of Patent: Sep. 14, 2010

(54) BLIND WITH EASY ACCESS FEATURES

(76) Inventor: Howard Dysle, 825 Balboa Ave., #203, Capitola, CA (US) 95010

( * ) Notice: Subject to any disclaimer, the term of this patent is extended or adjusted under 35 U.S.C. 154(b) by 126 days.

(21) Appl. No.: 11/521,071

(22) Filed: Sep. 14, 2006

(65) Prior Publication Data

US 2008/0066365 A1    Mar. 20, 2008

(51) Int. Cl.
*E04H 9/12* (2006.01)
(52) U.S. Cl. .......................... 52/169.6; 52/169.7; 52/20
(58) Field of Classification Search ............... 52/169.6, 52/169.7, 19, 20, DIG. 4, 79, 79.1; 210/541; 405/25, 26; 43/1
See application file for complete search history.

(56) References Cited

U.S. PATENT DOCUMENTS

| | | | | |
|---|---|---|---|---|
| 1,799,123 A * | 3/1931 | Robertson | ........................ | 49/53 |
| 2,871,802 A * | 2/1959 | Fishler | ........................ | 109/1 S |
| 2,936,504 A * | 5/1960 | Harris | ........................ | 405/266 |
| 3,159,117 A * | 12/1964 | Rosenfeld | .................... | 109/1 S |
| 3,196,813 A * | 7/1965 | Mchugh, Jr. | ................. | 109/1 S |
| 4,241,543 A * | 12/1980 | Foscarini et al. | .......... | 52/741.11 |
| 4,472,911 A * | 9/1984 | Jooris et al. | ..................... | 52/20 |
| 4,508,469 A * | 4/1985 | Dumortier | .................... | 404/25 |
| 4,738,045 A * | 4/1988 | Cardozo | ........................... | 43/1 |
| 4,955,166 A * | 9/1990 | Qualline et al. | ............. | 52/169.6 |
| 5,749,181 A * | 5/1998 | Bauman | ..................... | 52/169.6 |
| 5,927,012 A * | 7/1999 | Cermola et al. | ............... | 49/141 |
| 5,930,961 A * | 8/1999 | Beaudet | ...................... | 52/169.6 |
| 5,938,645 A * | 8/1999 | Gordon | ....................... | 604/264 |
| 6,105,728 A | 8/2000 | Combs, Jr. | | |
| 6,401,409 B1 * | 6/2002 | Martin | ....................... | 52/169.6 |
| 6,434,896 B1 * | 8/2002 | Mitchell | ..................... | 52/169.6 |
| 2003/0172574 A1 | 9/2003 | Drummond | | |

\* cited by examiner

*Primary Examiner*—Richard E Chilcot, Jr.
*Assistant Examiner*—Chi Q Nguyen
(74) *Attorney, Agent, or Firm*—Michael A. Guth

(57) ABSTRACT

A blind adapted for easier access than that of traditional hunting blinds. A dual blind including easier access to the blind. A blind with a flip open entry which may then be closed, leaving only the traditional single person sized opening or openings open.

4 Claims, 8 Drawing Sheets

--PRIOR ART--

BLIND WITH EASY ACCESS FEATURES

BACKGROUND

1. Field of the Invention

This invention relates to sport, and more specifically to an easy access nature/hunting blind.

2. Description of Related Art

In modern times, hunting has evolved into a science, an integral part of which is deception. In appreciation of the nature of the match of wits between the hunter and the hunted, the hunter seeks devices which will conceal his or her presence in the hunted's habitat. Such devices have become known simply as blinds. Although blinds are typically used by sportsmen hunters, they may also be used by wildlife photographers and others.

A common blind shape is seen in FIG. 1. The blind 100 is shown in partial cutaway view. The top opening 102 sits somewhat above the level of the ground 101. The upper portion 103 of the blind 100 is typically narrow, and opens to a slightly larger region 104 further below. A seat 105 sits on the bottom 106 of the blind. The top is not shown in this figure. As one may see from FIG. 1, the typical blind is not designed around ease of access. In fact, the hunter typically lowers himself into the narrow top opening of the blind, steps on the seat, and then works his way down. This entry may be very difficult for a user who is not as spry as this motion requires. This entry may also be risky for an elderly or partially disabled user who may be more easily injured in an accident.

U.S. Pat. No. 6,105,728 to Combs illustrates a duck blind elevator system for elevating and lowering a handicapped individual into a duck blind while in a wheelchair. The system recognizes that not all hunters are fully able to utilize traditional blinds.

Although the traditional blind may be a difficult thing to enter into and exit from, very few hunters are wheelchair bound. However, many hunters may be unable or unwilling to crawl down into the narrow opening of a traditional blind due to limited mobility, or concern of risk of injury. Difficulty of exit.

What is called for is a blind that is accessible by users of somewhat limited mobility or who are concerned about entering a traditional blind and seek an easier access blind.

SUMMARY

A blind adapted for easier access than that of traditional hunting blinds. A dual blind including easier access to the blind. A blind with a flip open entry which may then be closed, leaving only the traditional single person sized opening or openings open.

DETAILED DESCRIPTION

Figure 2:
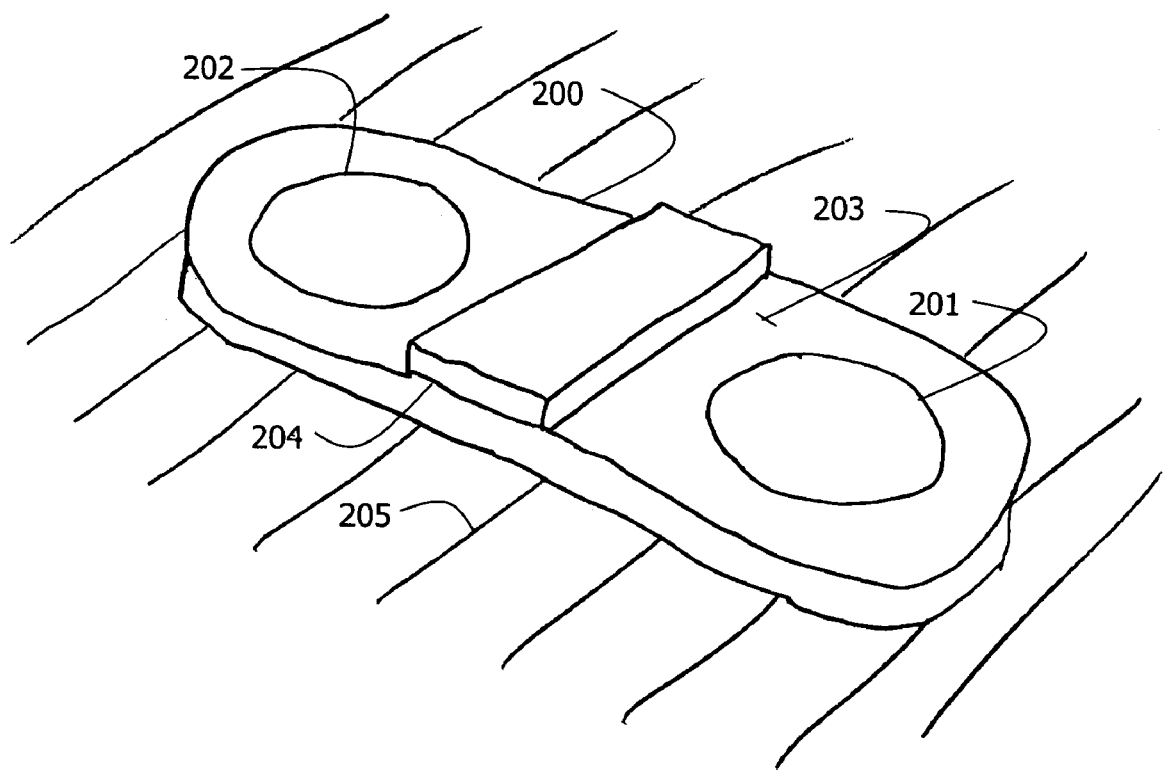
FIG. 2 is a perspective view sketch of a blind in the ground according to some embodiments of the present invention.

In some embodiments of the present invention, as seen in FIG. 2, a dual blind 200 is seen placed in the ground 205. Blinds may be buried in the ground in order to minimize their visual presence to prey. In addition, all visible surfaces are typically camouflaged with either paint, or the camouflage may be molded into the structure. With fiberglass, for example, the camouflage coloring may be added as part of the process of making the component. The blind has a main cavity within which the hunter may wait for prey. In some embodiments, the blind is sized such that the hunter may sit on a swiveling stool and have his/her head and shoulders up out of the top of the blind so that shots may be fired (or photographs may be taken, for example). In some embodiments, the blind is adapted for use by two hunters. The top 203 of the blind 200 has two surface access openings 201, 202 adapted for this surface access of the hunters within the main cavity of the blind. An entry access opening is located between the two surface access openings 201, 202 and is seen covered with a cover 204.

Figure 3:
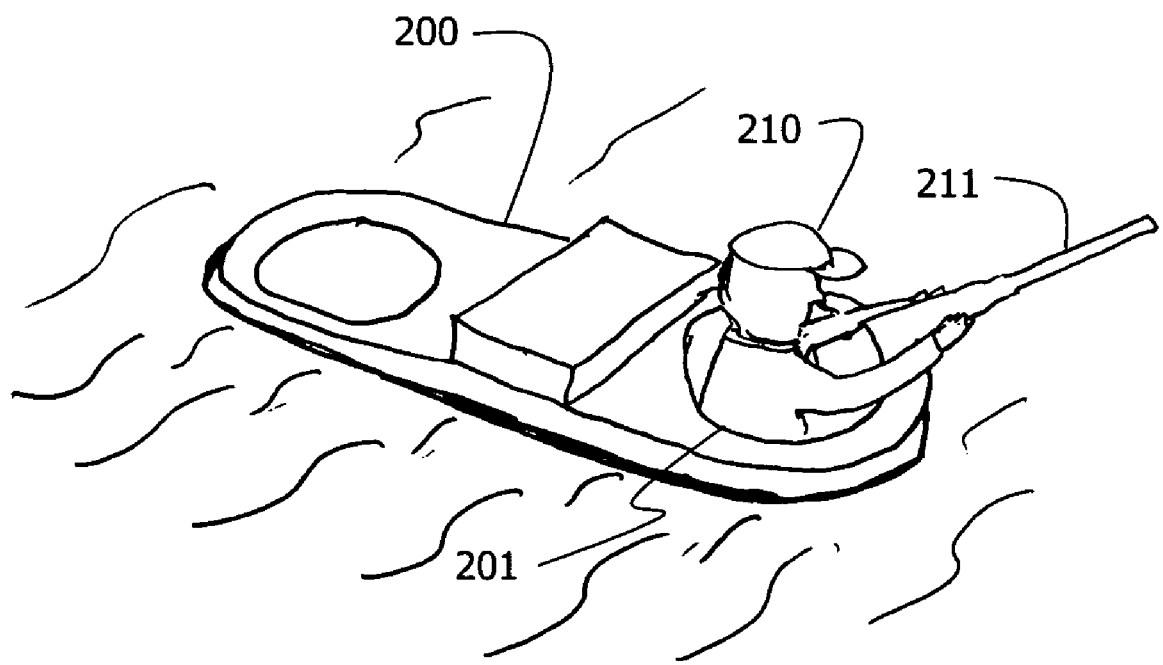
FIG. 3 is a sketch illustrating the use of a blind according to some embodiments of the present invention.

FIG. 3 illustrates the use of the blind 200 by a hunter 210. The hunter 210 is seen protruding from a surface access opening 201. The hunter 210 is wielding a gun 211. Most of the body of the hunter 210 is within the main cavity of the blind 200 and is actually below the surface of the ground. Although one hunter is shown, the blind 200 as seen in FIG. 3 is easily used by two hunters, each one utilizing their own surface access opening.

Figure 4:
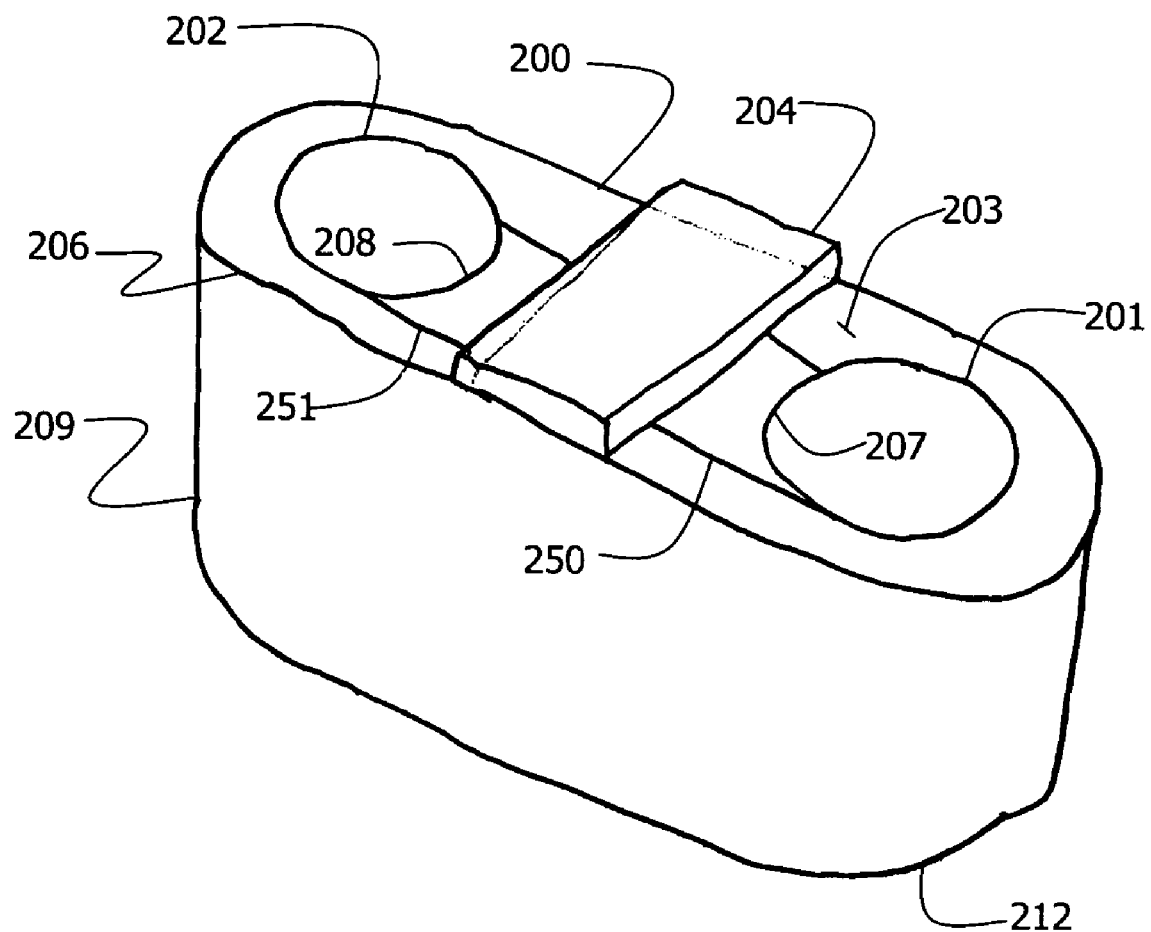
FIG. 4 is a sketch illustrating a blind according to some embodiments of the present invention.
Figure 6:
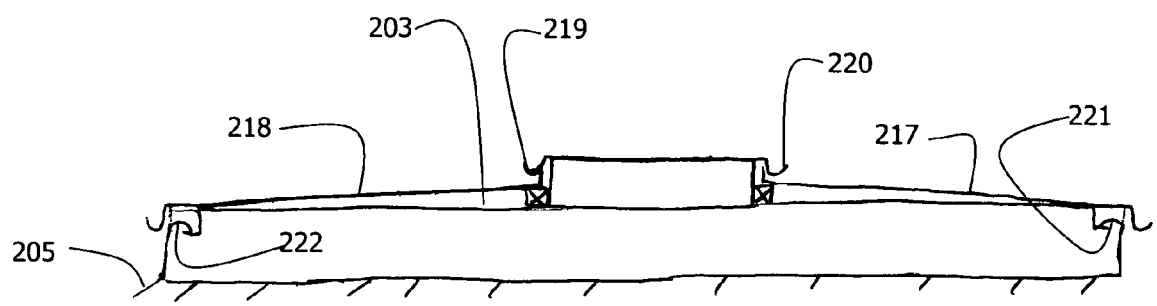
FIG. 6 is a ground level view of a blind with its covers on according to some embodiments of the present invention.

FIG. 4 illustrates a blind 200 not in the ground according to some embodiments of the present invention. The blind 200 has a top 203 and a bottom 212. The sides portion 209, along with the top 203 and the bottom 212, create a main cavity within the blind 200. The top, sides, and bottom of the blind may be a unitary structure, such as molded fiberglass, in some embodiments. In some embodiments, stiffeners may be added inside or outside of this structure. As seen in FIG. 6, the top may have catches for catching the covers that are placed over the top sides of the blind, and which cover the surface access openings when the blind is not in use.

A first surface access opening 201 is located in the top 203. A flip up access hatch cover 207 is seen. The flip up access hatch cover 207 makes it easier for one who has entered the blind to step from the center area to the area under the surface access opening 201. The access hatch cover 207 may be hinged along its back surface 250 so that this portion 207 of the top 203 is hinged out of the way of the user desiring to step from the middle of the blind to the access opening. The access hatch cover 207 may be constructed so that it may be hinged upwards along the hinge line along its back surface 250, but the cover 207, when closed, closes only to the plane of the top surface. In some embodiments, the cover may engage a stop on the top that provides support for the edge of the cover opposite the hinge line. A second flip up hatch cover 208 is seen adjacent to the other surface access opening 202. The second flip up hatch cover 208 is also hinged at its back surface 251. In some embodiments, the floor of the blind is slightly raised in the middle area, making the flip up hatch covers important for ease of movement within the blind.

Figure 1:
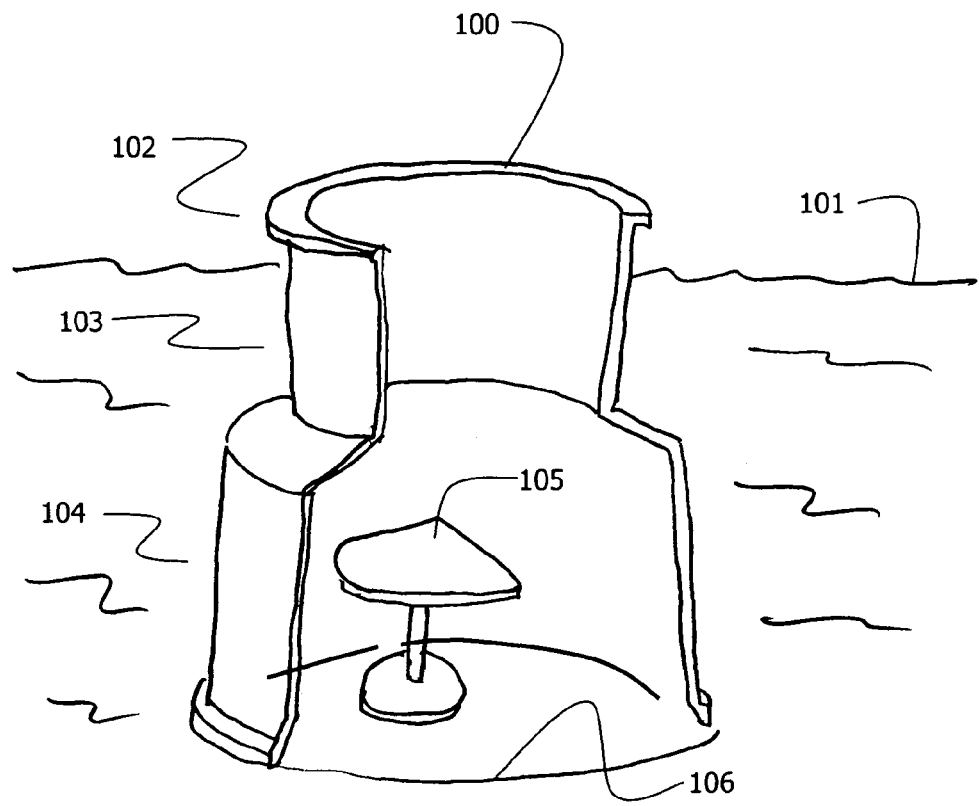
FIG. 1 is a partial cutaway view of a traditional duck hunting blind.
Figure 5:
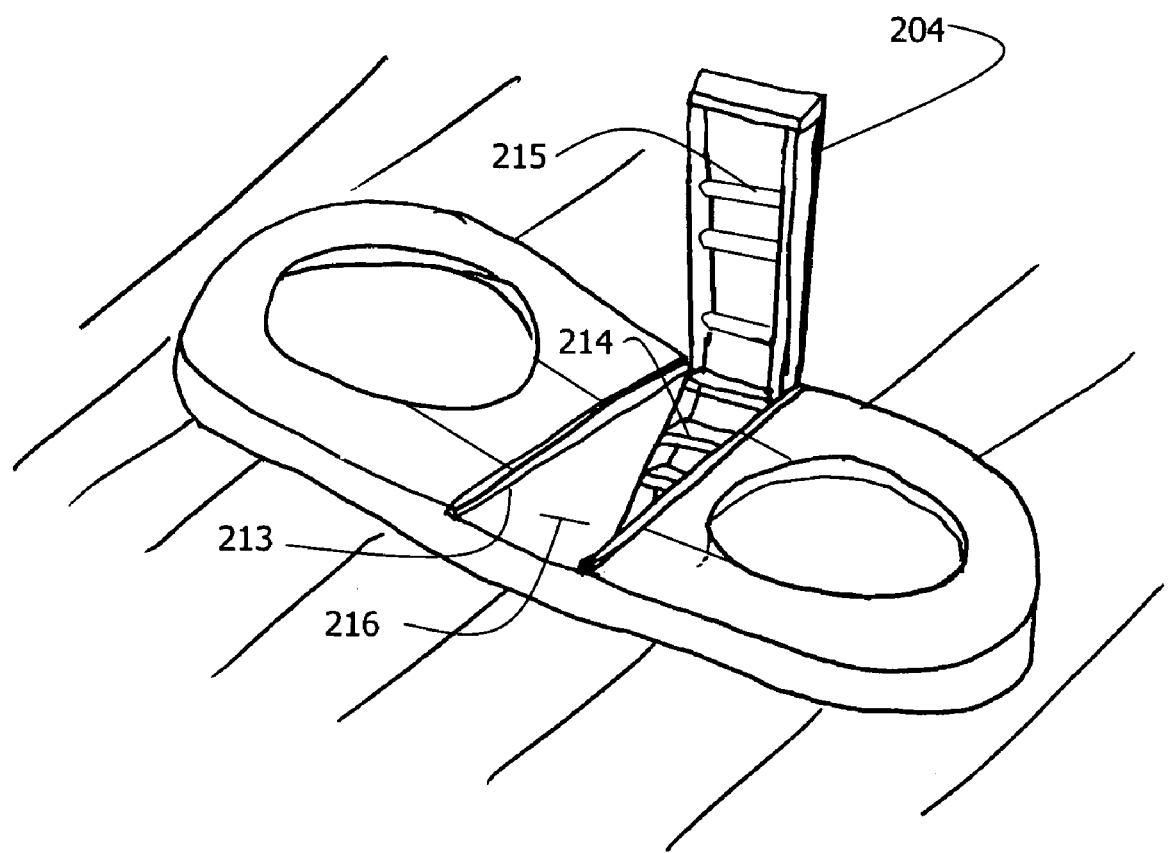
FIG. 5 is a sketch of a blind with the cover of its middle opening opened according to some embodiments of the present invention.

FIG. 5 illustrates an aspect of the blind allowing for easy access. In contrast to the traditional blind illustrated in FIG. 1, wherein the user must lower himself down through the surface access opening, a significantly easier entry is available. The middle cover 204 is seen in FIG. 5 in its open position showing the middle opening 213. A plurality of steps 214 are seen which allow for easy stepping from the bottom of the main cavity 216 up to the top of the blind, and vice versa. In some embodiments, there may be upper steps along the underside of the middle cover 204. In some embodiments, there may be hand rails 215 along the underside to assist the user in using the steps.

In some embodiments, the steps may be part of a ladder adapted to fit within the blind. A hinging ladder with one end on the bottom of the blind, and its other half attached to the underside of the middle cover may be used. The ladder may be latched into the open position to enhance stability.

FIG. 6 is a ground level view of the front of the blind illustrating the covers of the blind and the manner in which they may interlay according to some embodiments of the present invention. Side covers 217, 218 are used to cover over the surface access openings. In practice, the user of a blind wants to achieve at least two things when covering the blind after use. First, the user wants to minimize the risk of any leakage or weather damage to the interior of the blind. Second, the user wants to secure the blind against unauthorized entry. The cover over the middle opening of the blind is adapted to capture the side covers with overlays 219, 220 adapted to lock over the raised center edges of the side covers. The outer ends of the side covers are adapted to slide under catches 221, 222 in the top of the blind. Thus, the side covers can be slid into place under the catches at the far ends of the top of the blind with the middle cover open, then the middle cover can be closed, capturing the inner ends of the side covers. The middle cover can then be locked with a single lock while securing all three covers.

Figure 7:
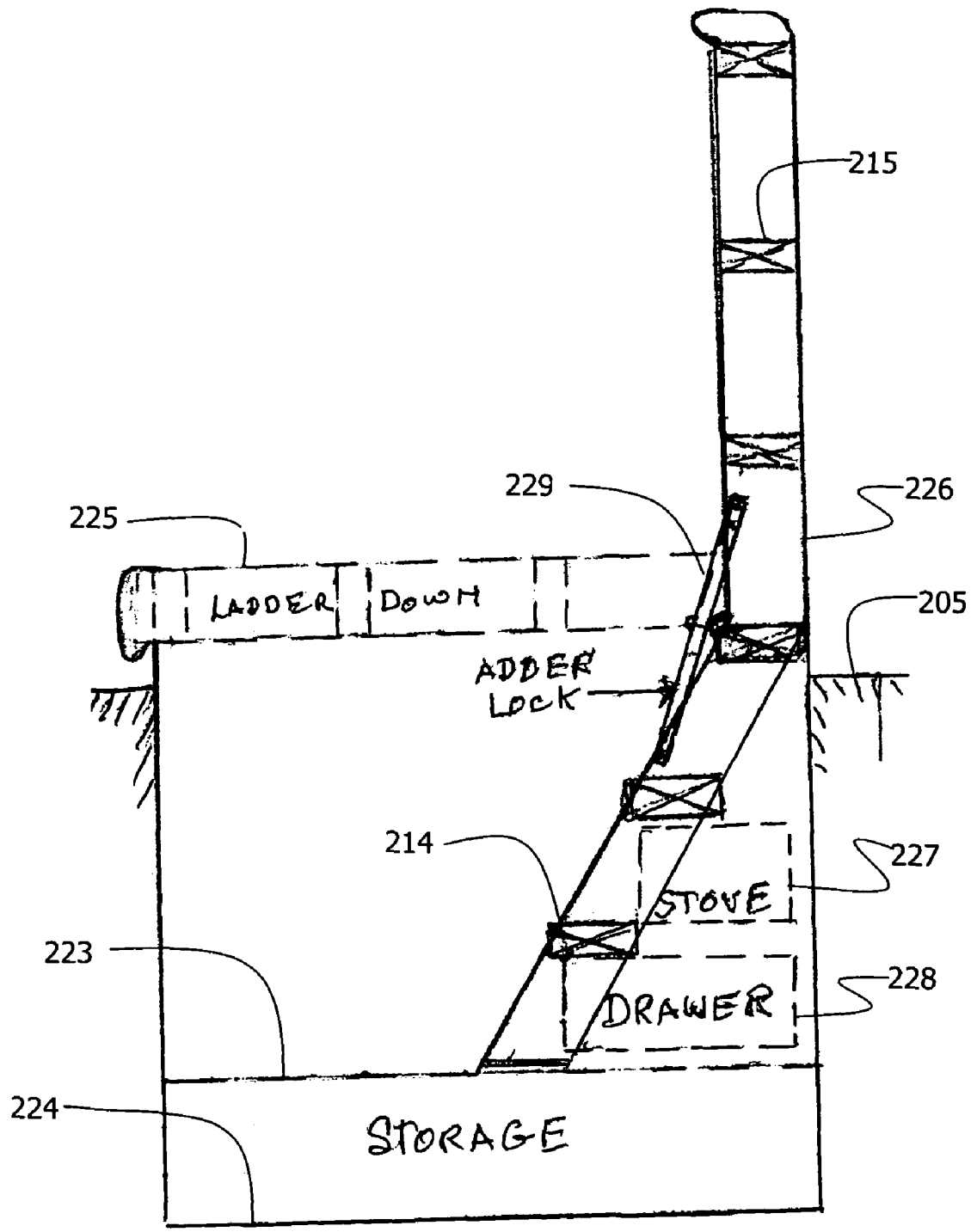
FIG. 7 is a cutaway side view of a blind according to some embodiments of the present invention.

FIG. 7 is a partial cutaway view of a blind according to some embodiments of the present invention. A plurality of steps 214 allow the user to step down into the blind without requiring difficult and strenuous motion as compared to the typical blind. The bottom of the steps is seen at the center floor level 223, which may be higher in the center section in some embodiments. The floor level 224 under the surface access openings may be at the bottom of the main cavity, whereas it may be somewhat higher in the center to allow for some storage in a sub-floor compartment. With the steps coming down into the cavity at an angle, there is created storage space behind the steps for a stove 227 and a drawer 228. The middle cover may be changed from a first closed position 225 to a second open position 226 to allow for entry and exit from the blind. The user would step down the steps and onto the somewhat raised center floor level. The middle cover may be held in the open position by a support 229, which may give further support to the user who may use the hand rails 215 which are raised when the middle cover is opened. The raised middle cover may have extra steps, horizontal rails, vertical rails, or a combination on its underside.

Figure 8:
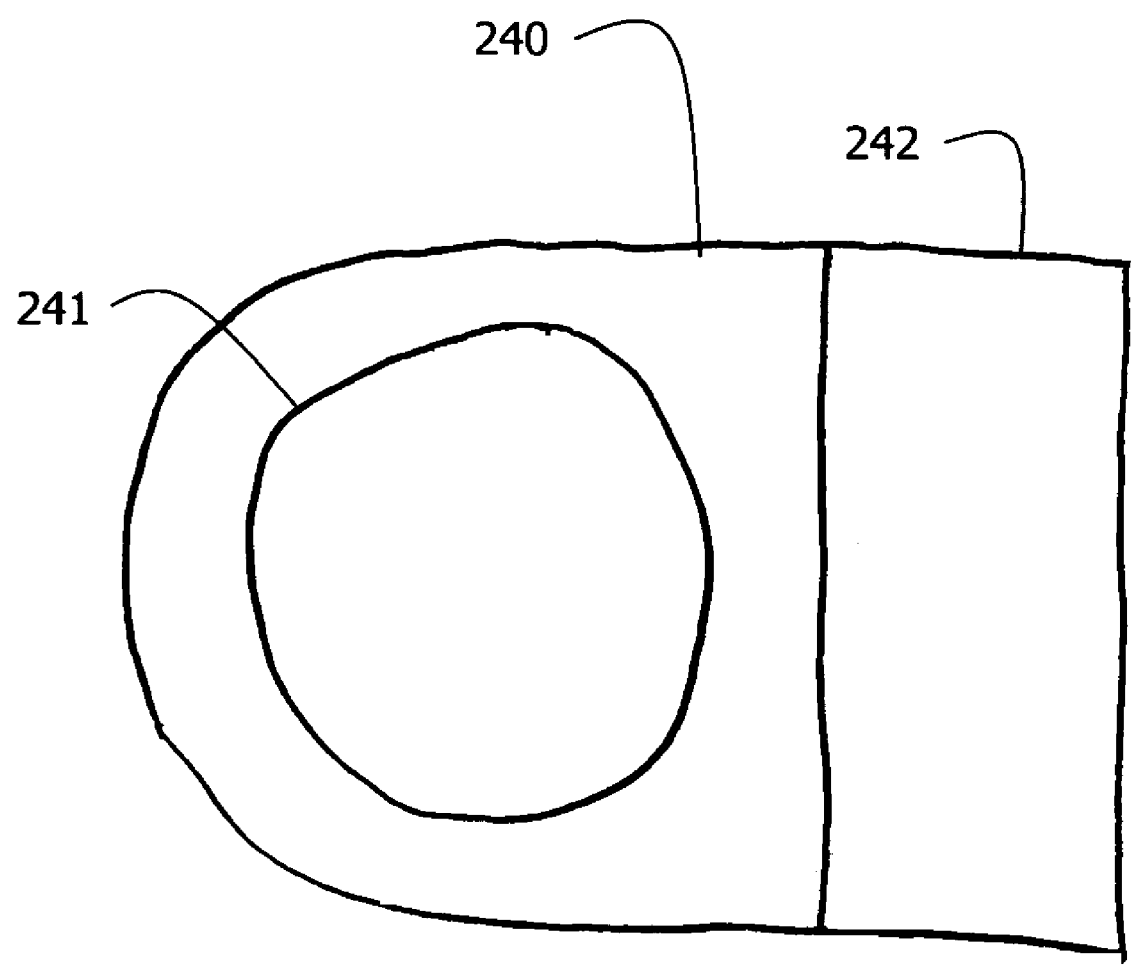
FIG. 8 is a top view of a single user blind according to some embodiments of the present invention.

FIG. 8 illustrates a top view of a blind 240 according to some embodiments of the present invention. A single surface access opening 241 is seen alongside an entry opening cover 242. The blind 240 may be entered using a plurality of steps as in other embodiments, but only a single space for a user is available.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A blind comprising:
   a main cavity adapted for occupancy by one or more users, said main cavity comprising:
      a bottom;
      a sides portion; and
      a top, said top comprising:
         a first opening, said first opening adapted to allow a user to stand up through;
         a second opening, said second opening adapted to allow a user to stand up through;
         a middle opening located between said first opening and said second opening, said middle opening adapted to allow a user to enter said main cavity; and
   a plurality of steps, said plurality of steps adapted to allow stepping from said bottom of said main cavity to said top of said main cavity, said plurality of steps located substantially under said middle opening;
   a middle cover adapted to cover said middle opening, wherein said first opening and said second opening are substantially circular,
wherein said middle cover is pivotally attached to said main cavity.

2. The blind of claim 1 wherein the bottom of said main cavity is raised under the middle opening relative to the areas under the first and second opening.

3. The blind of claim 2 wherein said main cavity further comprises a storage compartment under the raised middle portion of the bottom of said main cavity.

4. A blind comprising:
   a main cavity adapted for occupancy by one or more users, said main cavity comprising:
      a bottom;
      a sides portion; and
      a top, said top comprising:
         a first opening, said first opening adapted to allow a user to stand up through;
         a second opening, said second opening adapted to allow a user to stand up through;
         a middle opening located between said first opening and said second opening, said middle opening adapted to allow a user to enter said main cavity; and
   a plurality of steps, said plurality of steps adapted to allow stepping from said bottom of said main cavity to said top of said main cavity, said plurality of steps located substantially under said middle opening;
   a middle cover adapted to cover said middle opening, wherein said middle cover is pivotally attached to said main cavity.

* * * * *